(12) United States Patent
Hasberg et al.

(10) Patent No.: US 11,828,605 B2
(45) Date of Patent: Nov. 28, 2023

(54) CERTIFICATION OF MAP ELEMENTS FOR AUTOMATED DRIVING FUNCTIONS

(71) Applicant: Robert Bosch GmbH, Stuttgart (DE)

(72) Inventors: Carsten Hasberg, Ilsfeld-Auenstein (DE); Peter Christian Abeling, Hannover (DE)

(73) Assignee: ROBERT BOSCH GMBH, Stuttgart (DE)

( * ) Notice: Subject to any disclaimer, the term of this patent is extended or adjusted under 35 U.S.C. 154(b) by 344 days.

(21) Appl. No.: 17/034,548

(22) Filed: Sep. 28, 2020

(65) Prior Publication Data

US 2021/0164788 A1 Jun. 3, 2021

(30) Foreign Application Priority Data

Nov. 29, 2019 (DE) .......................... 102019218631.9

(51) Int. Cl.
*G01C 21/32* (2006.01)
*G01C 21/00* (2006.01)

(52) U.S. Cl.
CPC ......... *G01C 21/32* (2013.01); *G01C 21/3807* (2020.08); *G01C 21/3833* (2020.08)

(58) Field of Classification Search
CPC ............... G01C 21/32; G01C 21/3807; G01C 21/3833; G01C 21/3885
See application file for complete search history.

(56) References Cited

U.S. PATENT DOCUMENTS

| 2013/0197736 | A1* | 8/2013 | Zhu ...................... G05D 1/0088 701/26 |
| 2016/0342158 | A1* | 11/2016 | Nordbruch ............. G01C 21/32 |
| 2019/0107836 | A1 | 4/2019 | Walker et al. |
| 2020/0217669 | A1* | 7/2020 | Hu ......................... G01C 21/206 |
| 2021/0039671 | A1* | 2/2021 | Kim .................... G01C 21/3822 |

FOREIGN PATENT DOCUMENTS

| DE | 102005008185 A1 | 8/2006 | |
| DE | 102009045817 A1 | 4/2010 | |
| JP | 6806169 B2 * | 1/2021 | ............. B60R 25/20 |

* cited by examiner

*Primary Examiner* — Nga X Nguyen
(74) *Attorney, Agent, or Firm* — NORTON ROSE FULBRIGHT US LLP; Gerard Messina

(57) ABSTRACT

A method is described for the certification by a control unit of map elements for safety-critical driving functions. At least one observation variable of at least one mapping step of at least one map element is ascertained after an implementation of the mapping step via a monitoring function and is compared with a setpoint value of the observation variable. At least one result value is calculated based on a comparison of the observation variable with the setpoint value of the observation variable for the at least one mapping step via the monitoring function. The at least one result value is stored as a certificate and is linked to the at least one map element. A control unit, a computer program and a machine-readable memory medium are also described.

9 Claims, 2 Drawing Sheets

CERTIFICATION OF MAP ELEMENTS FOR AUTOMATED DRIVING FUNCTIONS

CROSS REFERENCE

The present application claims the benefit under 35 U.S.C. § 119 of German Patent Application No. DE 102019218631.9 filed on Nov. 29, 2019, which is expressly incorporated herein by reference in its entirety.

FIELD

The present invention relates to a method for the certification of map elements for safety-critical driving functions, to a control unit, to a computer program and to a machine-readable memory medium.

BACKGROUND INFORMATION

Automated driving functions and vehicles having automated driving functions are becoming increasingly important. Up-to-date and precise maps are essential for a successful implementation of automated driving functions.

With the use of digital maps for automated driving functions, it is possible to compensate for limited sensor ranges and coverages of scanning areas of the sensors of vehicles and to enable a complete sensing of the surroundings.

In addition, digital maps may be created outside a vehicle environment using a normally higher computing power, as a result of which it is possible to process and provide more complex processing algorithms and a higher volume of data. The utilization of the maps by an on-board control unit requires less computing power than the vehicle-external creation of the maps.

In the case of safety-critical functions, however, the use of vehicle-externally created maps is problematic. If digital maps are utilized by an automated driving function of a vehicle, errors and inaccuracies during the creation of the map may result in hazardous traffic situations.

SUMMARY

An object of the present invention is to provide of a method for enabling a use of maps for safety-critical driving functions.

This object may be achieved with the aid of example embodiments of the present invention. Advantageous example embodiments of the present invention are described herein.

According to one aspect of the present invention, a method is provided for the certification by a control unit of map elements for safety-critical driving functions. The certification may preferably be carried out by a vehicle-external control unit or by a server unit.

The certification may be carried out for each digital map element of a digital map such as, for example, map tile or a map chunk, or for an entire digital map.

In one step, at least one observation variable of at least one mapping step of at least one map element is ascertained via a monitoring function after an implementation of the mapping step and is compared with a setpoint value of the observation variable. The mapping steps may be carried out preferably by the control unit.

The mapping may take place using mapping methods based, for example, on a graph modelling. For example, Graph SLAM methods may be used, which explicitly model vehicle positions and vehicle orientations, so-called vehicle poses. The following exemplary mapping steps may be carried out:

measured data ascertained by sensors of multiple mapping vehicles are received by the control unit.

the received measured data are pre-processed.

the measured data received by different mapping vehicles are oriented geometrically. The orientation may take place with the aid of static landmarks and features, which are detectable by the control unit in different measured data sets.

after the orientation, the position of the static landmarks and also the poses of the mapping vehicles may be ascertained.

in one further mapping step, localization maps may be created from the landmarks. The trajectory driven by the mapping vehicles may be derived from the sequence of the vehicle poses.

foreign trajectories of other road users are contained in the measured data sets. Maps, which combine the historical behavior of the other road users, may be derived on the basis of the vehicle trajectories and foreign trajectories.

in addition to the analysis of the trajectories, the landmarks may be further processed to form planning maps.

The monitoring function in this case may be carried out according to one, according to multiple or according to each of the mapping steps cited by way of example, in order to validate the respective mapping steps and thus to ensure a correct and precise map creation.

In one further step, at least one result value is calculated via the monitoring function based on a comparison of the observation variable with the setpoint value of the observation variable for the at least one mapping step.

The result value may, for example, represent an accuracy or a quality of the respective mapping step and thus assess the at least one completed mapping step.

The result value may preferably be used to maintain a particular accuracy or a particular quality during the mapping step. A certification may not be issued if a predefined result value is not reached and the map element may not be used for safety-critical applications.

The at least one result value is subsequently stored as a certificate if the at least one result value or all calculated result values adhere to a tolerance range. The created certificate is subsequently linked to at least one map element.

The at least one map element including the associated certificate are provided to road users so that the road users are able to execute automated driving functions.

In the case of multiple mapping steps checked via the monitoring function, the respective result values for each mapping step may be combined, for example, in a total value in order to technically simplify the further handling and creation of the certificate.

When creating the total value, the respective result values may be weighted equally or to varying degrees.

The at least one map element may be provided with the linked certificate via a communication link to vehicles for carrying out automated driving functions.

Before the map element is used, the total value secured in the certificate for this map element may be decoded in the vehicle or by an on-board processing unit. The map element may then be used by the automated driving function or by a localization unit of the vehicle if the total value is positive or is within the tolerance range.

According to one further aspect of the present invention, a control unit is provided, that control unit being configured to carry out the method. The control unit may, for example, be an on-board control unit, a vehicle-external control unit or a vehicle-external server unit such as, for example, a cloud system.

According to one aspect of the present invention, a computer program is also provided, which encompasses commands which, when the computer program is executed by a computer or a control unit, prompts the computer to carry out the method according to the present invention. According to one further aspect of the present invention, a machine-readable memory medium is provided, on which the computer program according to the present invention is stored.

According to the BASt standard, the vehicle may be operable in an assisted, semi-automated, highly automated and/or fully automated or driverless manner.

The vehicle may, for example, be a passenger car, a truck or a robotaxi and the like. The vehicle is not limited to an operation on roads. Instead, the vehicle may also be designed as a watercraft, an aircraft such as, for example, a transport drone and the like.

With the method, it is possible to check the different map levels such as, for example, localization map, planning map and the like during the mapping, as a result of which the use of the map element in safety-critical functions of the vehicle is ensured. Map elements checked via the monitoring function may, in particular, fully meet the requirements of the ISO 26262 Standard.

According to one exemplary embodiment of the present invention, the at least one mapping step is carried out as a pre-processing of measured data of at least one sensor, as an orientation of pre-processed measured data, as a creation of a localization map, as a creation of a behavior map of road users and/or as a creation of a planning map.

The plurality of monitoring functions used may ensure that all relevant components or sections of the map creation are monitored. This measure increases the reliability of the entire system.

In the mapping step designed as a pre-processing of the measured data, the monitoring function may, for example, use the observation variables in the form of a number of measured data sets, an age of the measured data, and weather during the recording of the measured data, and compare them with setpoint values. The monitoring function may use as setpoint values, for example, a number of measured data sets of at least five, an age of the measured data of at most three hours, and weather that does not adversely affect the sensor system.

If a monitoring function is used for validating the orientation step of the measured data, so-called Olson's loops may be used as a measure of quality or as an observation variable. A setpoint value may, for example, be no greater than 0.05.

After the creation of the localization map as a further mapping step, a monitoring function may take a number of localization features as observation variables into account. The number of localization features may include, for example, at least 50 landmarks.

The mapping step carried out for creating the behavior map may also be checked via a monitoring function. For example, a number of used behavior patterns of different road users from at least 100 measured data sets may be present in order to enable a positive assessment of the mapping step via the monitoring function.

A subsequent creation of the planning map may be checked via a monitoring function in order, for example, to rule out inconsistencies between the map and legal requirements. For example, a number of detected inconsistencies such as, for example, a speed limit of 100 km/h within built-up-areas, which should be 50 km/h, may be used as an observation variable by the monitoring function. The setpoint value for the number of inconsistencies should not differ from zero.

The at least one monitoring function may, for example, be designed as a software module, which is executable by the control unit.

According to one further specific embodiment, one monitoring function each is carried out after each mapping step for ascertaining and validating observation variables of the respective mapping step. This measure may ensure that all relevant components of the map creation are monitored, which increases the reliability of the entire system.

According to one further exemplary embodiment of the present invention, the at least one result value ascertained via the monitoring function after each mapping step is conveyed via a communication link to a secured processing unit, for example, a secured SPS hardware unit, the at least one result value being stored as a certificate by the secured processing unit.

The results of the monitoring function or of the monitoring functions carried out after each mapping step may preferably be transmitted via a secured communication to a secured processing unit.

The processing unit is able to link the result values of the monitoring functions carried out for each mapping step logically to one value per map element. In this case, a weighting of the result values may be carried out, which have been ascertained from different mapping steps via the monitoring functions. For example, the result value for a pre-processing of measured data may be weighted lower than a result value of an orientation of the measured data.

The processing unit may, for example, be structured as a cluster of multiple error-protected SPS hardware elements and may thus provide a safety concept resembling a so-called AVP safety concept.

According to one further specific embodiment of the present invention, the result values ascertained via the monitoring function are conveyed via an encrypted communication link to the secured processing unit. With this measure, it is possible to carry out an additional safeguarding of the result values before the processing unit combines the result values to form a total value.

According to one further exemplary embodiment of the present invention, a certificate is created for each map element, the certificate including a total value that combines all result values ascertained by the monitoring functions. In this way, a digital map made up of multiple map elements may be subdivided into subsections and thus certified in sections for safety-critical functions. As a result, the digital map may be used at least in sections for automated driving functions of vehicles.

The total value of the monitoring functions in the form of a certificate may preferably be added to each map element and may be conveyed via a secured communication link to the vehicle or to an on-board processing unit.

According to one further specific embodiment of the present invention, one certificate is created for each map element, the certificate including all result values ascertained by the monitoring functions. In this form, not only is a consolidated total value stored in the map element, but each result value of the monitoring functions is stored separately in the form of a certificate.

In this way, a decision about the weighting of the result values of the monitoring functions may be made by an on-board processing unit utilizing the map element.

BRIEF DESCRIPTION OF THE DRAWINGS

Preferred exemplary embodiments of the present invention are explained in greater detail below with reference to highly simplified, schematic representations.

DETAILED DESCRIPTION OF EXAMPLE EMBODIMENTS

Figure 1:
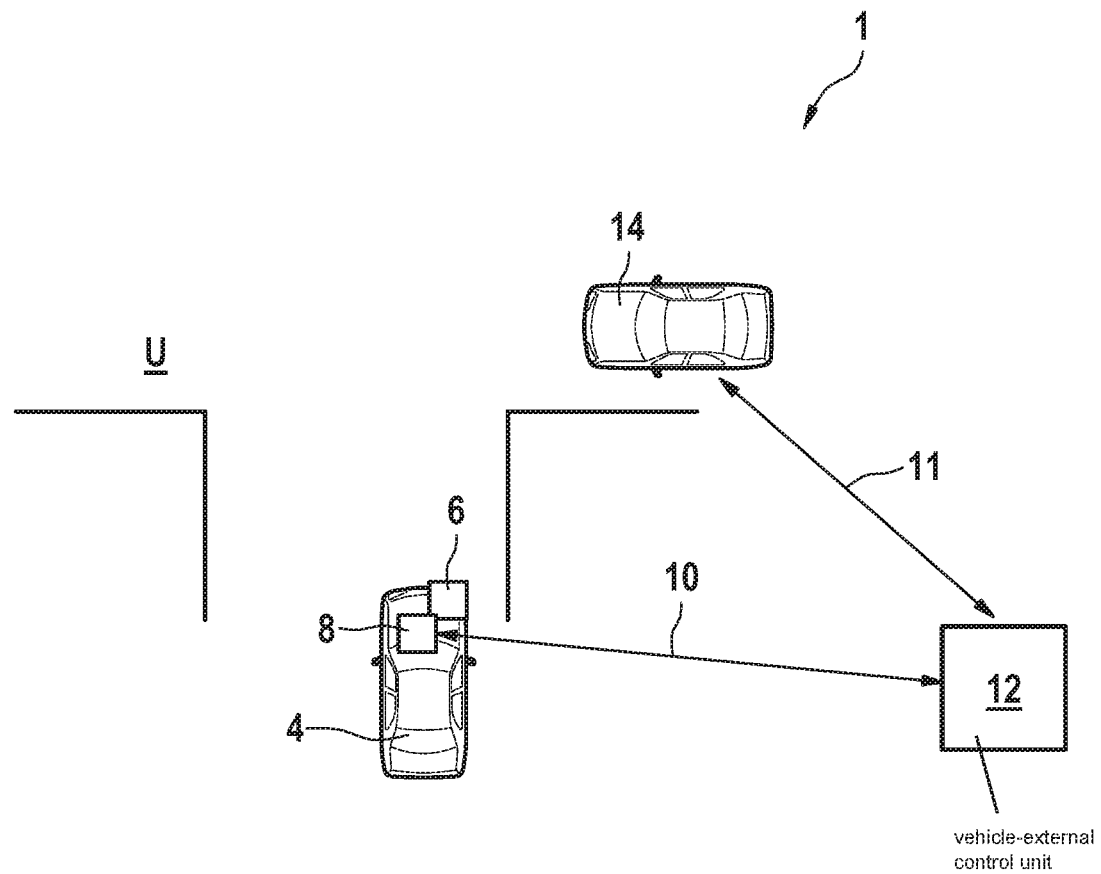
FIG. 1 schematically shows a representation of a vehicle arrangement for illustrating one method in accordance with an example embodiment of the present invention.

FIG. 1 schematically shows a representation of a vehicle arrangement 1 for illustrating a method 2. Vehicle arrangement 1 includes one or multiple mapping vehicle(s) 4.

Mapping vehicles 4 may, for example, be passenger cars equipped with a sensor system for detecting the surroundings.

Mapping vehicles 4 include sensors 6 for collecting measured data of surroundings U.

Sensor 6 may be designed as a LIDAR sensor, a radar sensor, a camera sensor and the like.

The measured data may be collected by on-board processing units 8 and may be transmitted via a communication link 10 to a vehicle-external control unit 12.

Communication link 10 may, for example, be based on a WLAN, UMTS, GSM, 4G, 5G, and the like, transmission standard.

Control unit 12 is designed as a vehicle-external server unit and is able to receive the measured data of mapping vehicles 4 and use them for creating digital maps.

Control unit 12 is able to create and certify the digital maps, preferably via multiple mapping steps, so that the digital maps are provided to vehicles 14 or road users via a further communication link 11 for implementing automated driving functions.

Figure 2:
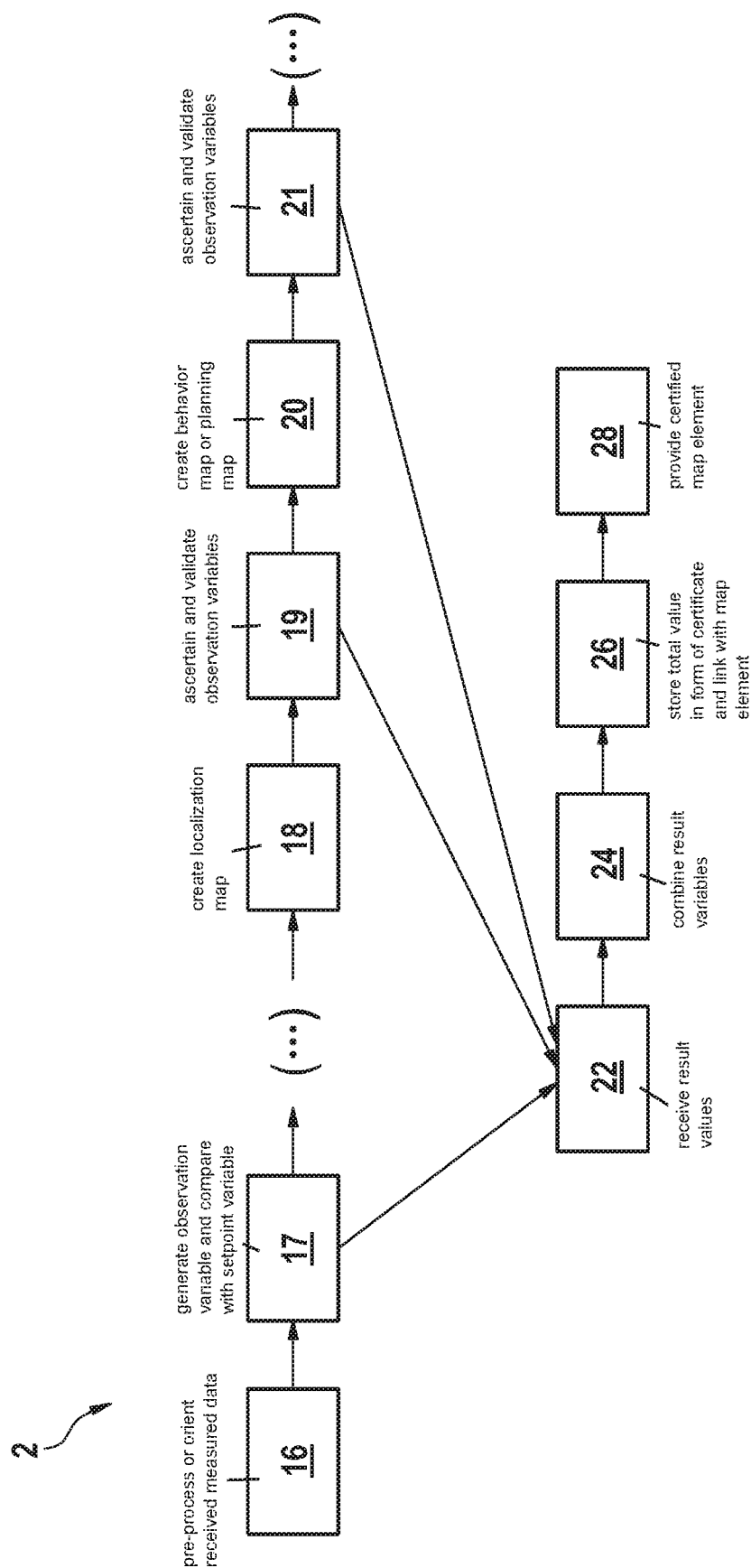
FIG. 2 schematically shows a flow chart for illustrating the method according to one specific embodiment of the present invention.

A flow chart for illustrating method 2 according to one specific embodiment of the present invention is schematically represented in FIG. 2. Method 2 is used for the certification by control unit 12 of map elements for safety-critical driving functions. The mapping takes place in sections or map element by map element. For the sake of simplicity, method 2 is described with reference to one map element.

A first mapping step is carried out in a step 16. The first mapping step may include, for example, a pre-processing or orientation of received measured data.

At least one observation variable of first mapping step 16 is subsequently ascertained after an execution of the first mapping step via a first monitoring function 17 and compared with a setpoint value of the observation variable.

One monitoring function 17, 19, 21 each is carried out after each mapping step 16, 18, 20 for ascertaining and validating observation variables of respective mapping step 16, 18, 20.

A creation of a localization map, for example, may take place as a second exemplary mapping step 18. An exemplary third mapping step 20 may include a creation of a behavior map of road users and or a creation of a planning map.

Further intermediate steps or further mapping steps may be carried out which, for the sake of clarity, are not depicted.

One monitoring function 17, 19, 21 each is carried out after each mapping step 16, 18, 20. Monitoring functions 17, 19, 21 may preferably be adapted to mapping steps 16, 18, 20.

At least one result value is calculated via the monitoring function based on a comparison of the observation variables with setpoint values of the observation variables.

Result values ascertained by the monitoring function are conveyed to a secured processing unit 22. Secured processing unit 22 may, for example, be designed as a secured SPS hardware unit.

The received result values are combined 24 by secured processing unit 22 to form a total value. In this case, the respective result values may be weighted to varying degrees.

In a further step 26, the total value is stored in the form of a certificate and linked with the map element.

The map element thus certified may be subsequently provided 28 to road users 14.

What is claimed is:

1. A method for certification by a control unit of map elements for automated driving functions, the method comprising:

performing at least one mapping step, which includes pre-processing or orientation of received measured data, wherein the measured data is obtained by at least one sensor of a mapping vehicle;

ascertaining, via a processor, an observation variable of the at least one mapping step, after an implementation of the at least one mapping step, and comparing the observation variable with a setpoint value of the observation variable;

calculating, via the processor, at least one result value as validation of a quality of the at least one mapping step, based on the comparison of the observation variable with the setpoint value of the observation variable for the at least one mapping step;

storing, via the processor, the at least one result value as a certificate linked with the at least one map element; and providing, via the processor, the at least one map element including the certificate to the automated driving functions;

wherein an automated driving function uses the certifications of the map elements, wherein the at least one mapping step includes mapping at least one map element, wherein the certification of the map elements for the automated driving functions is carried out by a vehicle-external control unit or by a server unit, wherein monitoring functions use the observation variables of a number of measured data sets, an age of the measured data, and weather during a recording of the measured data, and compares the observation variables with setpoint values, wherein the measured data are measured by sensors of the mapping vehicle and are collected by on-board processing units of the mapping vehicle, wherein a total value of the monitoring functions are added to each of the map elements and conveyed via a secured communication link to the vehicle external control unit or the server unit or to one of the on-board processing units, wherein the at least one mapping step includes a second mapping step and a third mapping step, wherein the second mapping step includes creating a localization map, and wherein the third mapping step includes creating a behavior map of road users and or creating a planning map, and wherein the communication link is based on a WLAN, UMTS, GSM, 4G, or 5G, transmission standard.

2. The method as recited in claim 1, wherein the at least one mapping step includes:
(i) pre-processing of measured data of at least one sensor, and/or (ii) orienting pre-processed measured data, and/or (iii) creating a localization map, and/or (iv) creating a behavior map of road users, and/or (v) creating a planning map.

3. The method as recited in claim 1, wherein the at least one monitoring functions are carried out after each respective mapping step of the at least one mapping step for ascertaining and validating observation variables of the respective mapping step.

4. The method as recited in claim 3, wherein the at least one result value ascertained after each respective mapping step via a respective one of the monitoring functions is conveyed via a communication link to a secured processing unit, the at least one result value being stored as the certificate by the secured processing unit.

5. The method as recited in claim 4, wherein the at least one result value is conveyed via an encrypted communication link to the secured processing unit.

6. The method as recited in claim 1, wherein a respective certificate is created for each respective map element, the respective certificate including the total value, which combines all result values ascertained via the monitoring functions.

7. The method as recited in claim 1, wherein a respective certificate is created for each respective map element, the respective certificate including all result values ascertained via the monitoring functions.

8. A control apparatus for certification of map elements for automated driving functions, comprising:
a control unit having a processor configured to perform the following:
ascertaining, via the processor, an observation variable of at least one mapping step, after an implementation of the at least one mapping step, and comparing the observation variable with a setpoint value of the observation variable, wherein the at least one mapping step includes pre-processing or orientation of received measured data, wherein the measured data is obtained by at least one sensor of a mapping vehicle;
calculating, via the processor, at least one result value as validation of a quality of the at least one mapping step, based on the comparison of the observation variable with the setpoint value of the observation variable for the at least one mapping step;
storing, via the processor, the at least one result value as a certificate linked with the at least one map element;
providing, via the processor, the at least one map element including the certificate to the automated driving functions;
wherein an automated driving function of an automated driving function uses the certifications of the map elements,
wherein the at least one mapping step includes mapping at least one map element,
wherein the certification of the map elements for the automated driving functions is carried out by a vehicle-external control unit or by a server unit, and
wherein monitoring functions use the observation variables of a number of measured data sets, an age of the measured data, and weather during a recording of the measured data, and compares the observation variables with setpoint values, wherein the measured data are measured by sensors of the mapping vehicle and are collected by on-board processing units of the mapping vehicle,
wherein a total value of the monitoring functions are added to each of the map elements and conveyed via a secured communication link to the vehicle external control unit or the server unit or to one of the on-board processing units,
wherein the at least one mapping step includes a second mapping step and a third mapping step, wherein the second mapping step includes creating a localization map, and wherein the third mapping step includes creating a behavior map of road users and or creating a planning map, and
wherein the communication link is based on a WLAN, UMTS, GSM, 4G, or 5G, transmission standard.

9. A non-transitory machine-readable memory medium, on which is stored a computer program, which is executable by a processor, comprising:
a program code arrangement having program code for certification by a control unit of map elements for automated driving functions, by performing the following:
ascertaining, via the processor, an observation variable of at least one mapping step, after an implementation of the at least one mapping step, and comparing the observation variable with a setpoint value of the observation variable, wherein the at least one mapping step includes pre-processing or orientation of received measured data, wherein the measured data is obtained by at least one sensor of a mapping vehicle;
calculating, via the processor, at least one result value as validation of a quality of the at least one mapping step, based on the comparison of the observation variable with the setpoint value of the observation variable for the at least one mapping step;
storing, via the processor, the at least one result value as a certificate linked with the at least one map element;
providing, via the processor, the at least one map element including the certificate to the automated driving functions;
wherein automated driving function use the certifications of the map elements;
wherein the at least one mapping step includes mapping at least one map element,
wherein the certification of the map elements for the automated driving functions is carried out by a vehicle-external control unit or by a server unit, and
wherein monitoring functions use the observation variables of a number of measured data sets, an age of the measured data, and weather during a recording of the measured data, and compares the observation variables with setpoint values, wherein the measured data are measured by sensors of the mapping vehicle and are collected by on-board processing units of the mapping vehicle,
wherein a total value of the monitoring functions are added to each of the map elements and conveyed via a secured communication link to the vehicle external control unit or the server unit or to one of the on-board processing units, wherein the at least one mapping step includes a second mapping step and a third mapping step, wherein the second mapping step includes creating a localization map, and wherein the third mapping step includes creating a behavior map of road users and or creating a planning map, and wherein the communication link is based on a WLAN, UMTS, GSM, 4G, or 5G, transmission standard.

\* \* \* \* \*